May 27, 1958     A. E. JOHNSON     2,836,736
ARC WELDING AND BATTERY CHARGING APPARATUS
Filed Aug. 2, 1956
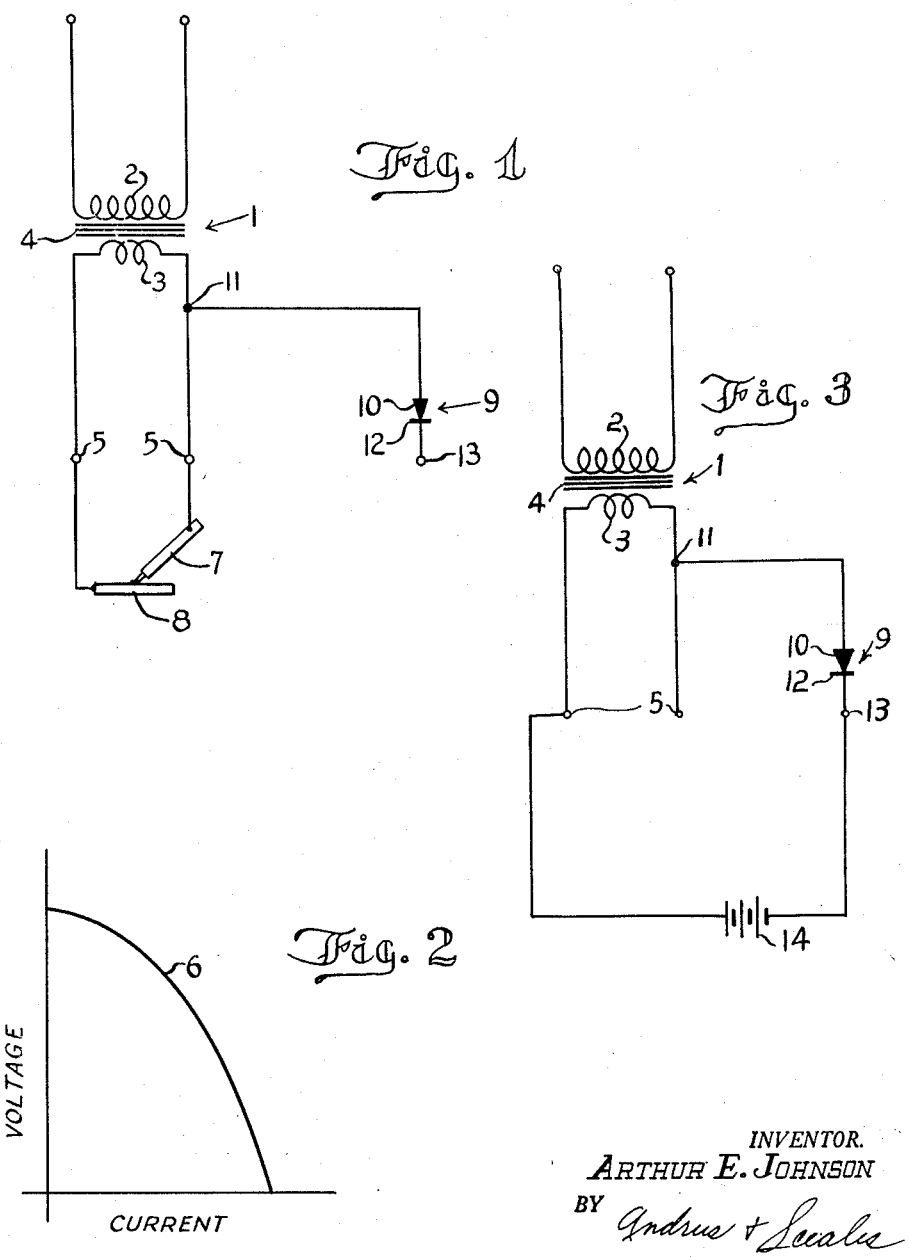
INVENTOR.
ARTHUR E. JOHNSON
BY Andrus & Scales
Attorneys

United States Patent Office 2,836,736
Patented May 27, 1958

2,836,736

ARC WELDING AND BATTERY CHARGING APPARATUS

Arthur E. Johnson, Elkhorn, Wis., assignor to A. O. Smith Corporation, Milwaukee, Wis., a corporation of New York Application August 2, 1956, Serial No. 601,784

4 Claims. (Cl. 307—155)

This invention relates to apparatus adapted for welding with alternating current or charging a low voltage battery.

In many places such as farms and the like, it is necessary and common for the owner to make repairs to his equipment with relatively small, inexpensive welding machines. In these same places, storage batteries are widely used and require frequent recharging due to the service to which they are subjected. Presently, two separate units are employed for welding and recharging storage batteries.

In accordance with the present invention, a single unit is employed which is adapted to provide an A. C. output suitable for welding and a D. C. output suitable for rapidly charging a low voltage battery. A conventional alternating current arc welding transformer has a half-wave rectifier connected in series with the transformer secondary. This permits the use of a low voltage rectifier which can economically and practically be connected to the conventional welder.

The present invention provides a simple, low cost combination arc welder and battery charger suitable for use in small installations.

The drawing furnished herewith illustrates the best mode presently contemplated for carrying out the invention.

In the drawing:

Figure 1 is a schematic wiring diagram of a welder-charger constructed in accordance with the present invention and connected for arc welding;

Fig. 2 is a representative static characteristic for the arc welding unit of Figure 1; and Fig. 3 is a schematic wiring diagram of a welder charger similar to Fig. 1 which is connected for charging a battery.

A transformer 1 has a primary winding 2 connected to a suitable alternating current source, not shown, and is magnetically coupled to a secondary winding 3 by a magnetic core represented by the conventional line symbol 4. The primary winding 2 comprises a large number of turns of relatively small wire adapted to be connected to a high voltage source. The secondary winding 3 comprises a small number of turns of relatively large wire adapted to furnish a welding current via the output terminals 5.

The relation of the number of turns in the primary and the secondary, in accordance with conventional practice, is such that the open circuit voltage across the secondary is a maximum of 80 volts.

The transformer 1 is a high leakage transformer having a drooping voltage versus current characteristic or curve 6 such as diagrammatically shown in Fig. 2. Thus, at open circuit there is a relatively high voltage across the output terminals of the secondary. But when a load is applied to and current flows in the secondary winding 3, the voltage rapidly falls off.

As shown in Figure 1, when the unit is to be employed for arc welding, an electrode 7 is connected to one terminal 5 and a workpiece 8 is connected to the other terminal 5. This forms a series circuit which is adapted to maintain an arc, not shown, between the electrode and the workpiece and thereby effect a welding operation.

To provide a battery charging circuit, a half-wave rectifier 9 has its anode 10 connected to one side of the secondary winding 3 shown as connected at a common junction 11 with the electrode terminal, and has its cathode 12 connected to a third output terminal 13.

As shown in Figure 3, to charge a battery 14, the battery is connected on one side to the third output terminal 13 and on the opposite side to the arc welding terminal 5 opposite the common junction 11 and thus serially connected with the secondary winding 3 and the rectifier 9.

The half-wave rectifier 9 is a dry plate type and has a low reverse peak inverse voltage which is below the open circuit voltage of the welding transformer 1 but above the resultant voltage as measured across the transformer winding 3 and the battery 14 under operating conditions.

Although the rectifier 9 has a low reverse peak voltage, the danger of injury or destruction is eliminated because the rectifier is connected in a half-wave circuit and therefore is always in series circuit with a battery when connected to the transformer. As the transformer 1 has the drooping characteristic, illustrated in Fig. 2, the voltage rapidly decreases with the load and therefore rapidly drops below the permissive operating inverse peak voltage for the rectifier.

It is important that a half-wave rectifier circuit rather than a conventional full wave rectifier circuit be employed in combination with the welding transformer because in a full wave rectifier circuit, the rectifiers are connected across the source in a complete circuit without the connection of the load. Therefore, the rectifiers are then subjected to the full open circuit voltage of the transformer before the battery is connected in the circuit, which voltage in a welding transformer is relatively high. The rectifiers would then have to have a high inverse peak voltage capacity and would consequently be so expensive as to be impractical.

Although the described arc welding source is a conventional high leakage transformer having a drooping voltage characteristic, the source may be of any other suitable type; for example, a constant potential transformer in combination with reactance means to give the desired characteristic.

The present invention provides a low-cost combination arc welder-battery charger which is entirely suitable for small jobs such as found in the home and on the farm.

Various modes of carrying out the invention are contemplated as being within the scope of the following claims particularly pointing out and distinctly claiming the subject matter which is regarded as the invention.

I claim:

1. In combination, an alternating current welding source having a drooping voltage versus current characteristic to provide alternating arc welding current, and a rectifier connected in an open circuit with the output of said source to provide a battery charging circuit with the output voltage of the source being connected across the rectifier in series with a battery during the charging operation, said construction reducing the peak inverse voltage applied to the rectifier.

2. In combination, an alternating current welding source having a drooping voltage characteristic to provide arc welding current, a dry plate rectifier assembly having an inverse peak voltage limitation below the open circuit voltage of the source, and a series circuit including the output of said welding source and said rectifier assembly and adapted to have a battery connected in series in said series circuit to provide a source of charging current to the battery and to thereby prevent the application of the open circuit voltage to said rectifier.

3. A combination welding and battery charging apparatus, which comprises a welding transformer having an output winding adapted to furnish a welding voltage, and half-wave rectifying means connected in series circuit with said winding to provide a charging voltage across said series circuit.

4. In a welding and battery charging combination adapted to be connected to conventional domestic A. C. power sources, a first transformer winding adapted to be connected to said A. C. source, a second transformer winding electromagnetically coupled to said first winding to provide an A. C. welding current, and a metal plate rectifier connected in series circuit with said second winding, said rectifier being a half-wave rectifier whereby the voltage across the series circuit is controlled by the load.

No references cited.